United States Patent [19]

De Feo et al.

[11] 4,363,504

[45] Dec. 14, 1982

[54] HIGH TEMPERATURE LINED CONDUITS, ELBOWS AND TEES

[75] Inventors: Angelo De Feo, Passaic; Edward Drewniany, Bergen, both of N.J.

[73] Assignee: Curtiss-Wright Corporation, N.J.

[21] Appl. No.: 109,628

[22] Filed: Jan. 4, 1980

[51] Int. Cl.$^3$ .............................................. F16L 59/14
[52] U.S. Cl. ....................................... 285/47; 285/55; 285/156; 285/179; 285/187; 285/DIG. 7; 138/149
[58] Field of Search .................. 285/47, 156, 155, 150, 285/55, 179, 187, DIG. 7; 138/149

[56] References Cited

U.S. PATENT DOCUMENTS

| | | | |
|---|---|---|---|
| 2,611,567 | 9/1952 | Williamson | 138/149 X |
| 3,645,564 | 2/1972 | Corriston | 285/47 |
| 3,850,714 | 11/1974 | Adorjan | 138/149 X |
| 3,865,145 | 2/1975 | McKay | 138/149 |
| 3,870,346 | 3/1975 | Kappeler | 138/149 X |
| 4,015,636 | 4/1977 | Fossen | 138/149 |
| 4,047,742 | 9/1977 | Haferkamp et al. | 285/47 |

FOREIGN PATENT DOCUMENTS 54-321  4/1979  Japan ................................. 138/149

*Primary Examiner*—Dave W. Arola
*Attorney, Agent, or Firm*—McGlew and Tuttle

[57] ABSTRACT

A high temperature lined conduit comprising, a liner, a flexible insulating refractory blanket around and in contact with the liner, a pipe member around the blanket and spaced therefrom, and castable rigid refractory material between the pipe member and the blanket. Anchors are connected to the inside diameter of the pipe and extend into the castable material. The liner includes male and female slip joint ends for permitting thermal expansion of the liner with respect to the castable material and the pipe member. Elbows and tees of the lined conduit comprise an elbow liner wrapped with insulating refractory blanket material around which is disposed a spaced elbow pipe member with castable refractory material between the blanket material and the elbow pipe member. A reinforcing band is connected to the elbow liner at an intermediate location thereon from which extend a plurality of hollow tubes or pins which extend into the castable material to anchor the lined elbow and permit thermal expansion. A method of fabricating the high temperature lined conduit, elbows and tees is also disclosed which utilizes a polyethylene layer over the refractory blanket after it has been compressed to maintain the refractory blanket in a compressed condition until the castable material is in place. Hot gases are then directed through the interior of the liner for evaporating the polyethylene and setting the castable material which permits the compressed blanket to come into close contact with the castable material.

29 Claims, 11 Drawing Figures

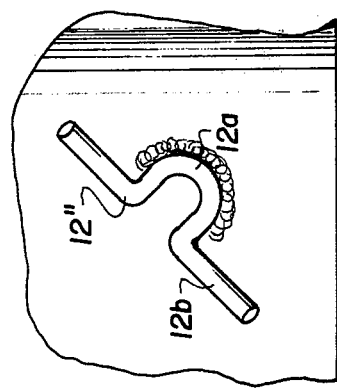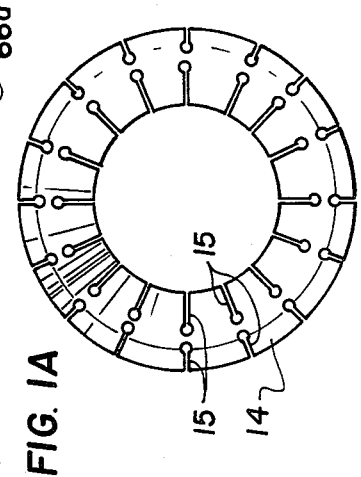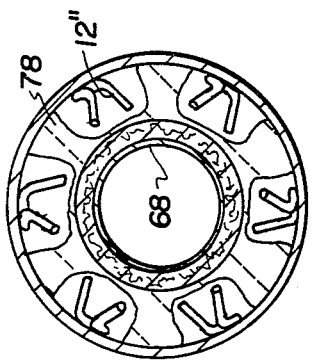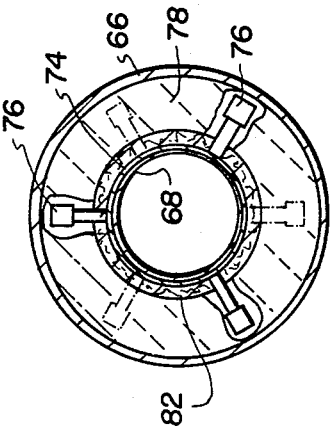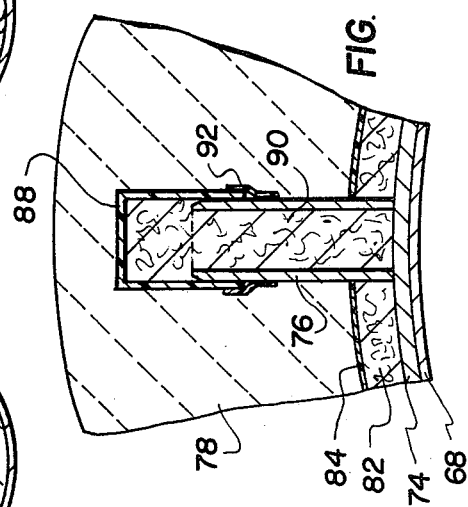

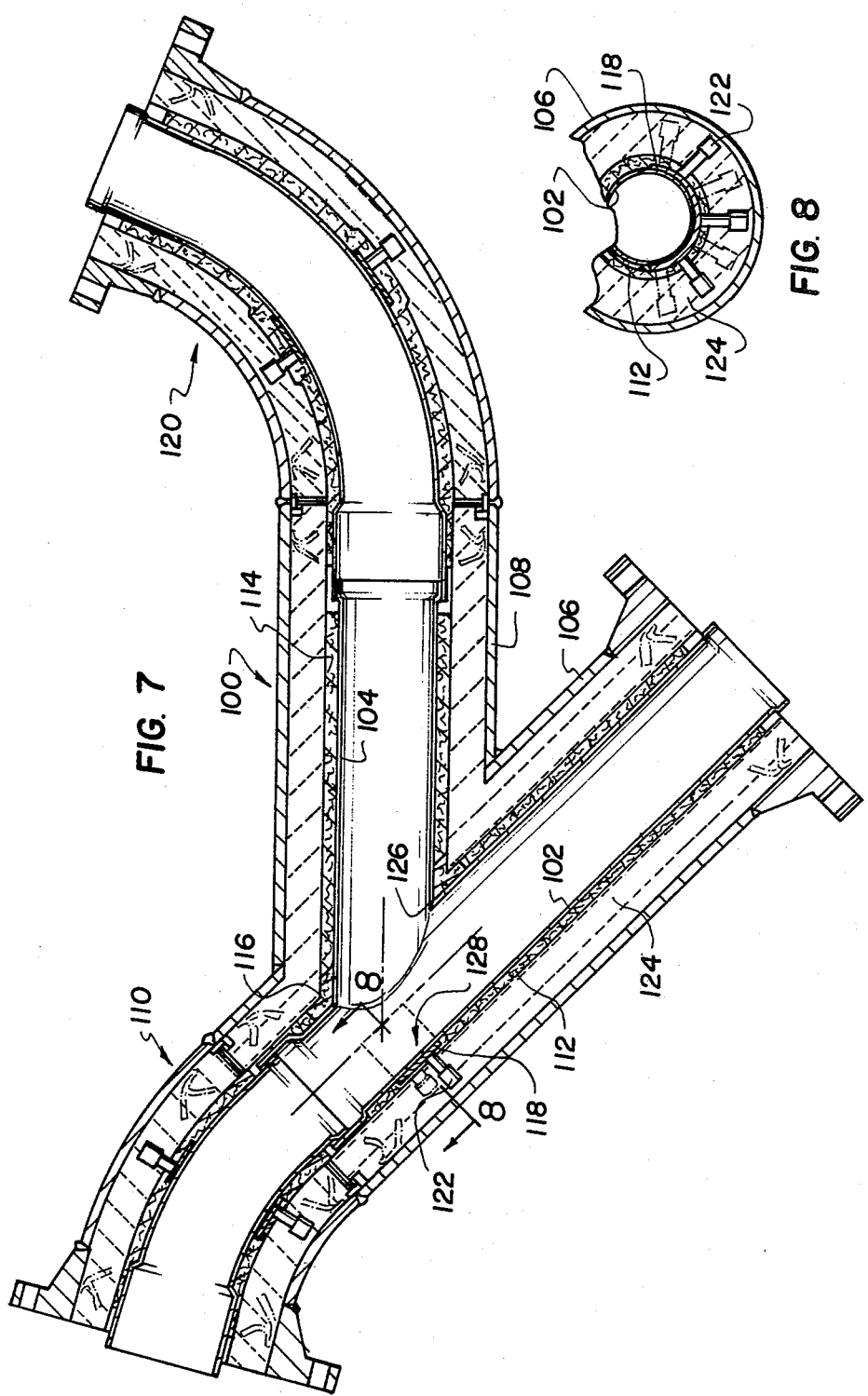

HIGH TEMPERATURE LINED CONDUITS, ELBOWS AND TEES

The Government has rights in this invention pursuant to Contract No. EX-76-C-01-1726 awarded by the U.S. Energy Research and Development Administration.

FIELD AND BACKGROUND OF THE INVENTION

The present invention relates in general to lined high temperature conduits and, in particular, to a new and useful high temperature lined conduit, including lined elbows and tees, which permit the thermal expansion of a liner with respect to an outer covering of the conduit, elbows and tees. The invention is also drawn to a method of fabricating the conduits, elbows and tees.

It is known to utilize lined conduits for conducting high temperature media such as hot combustion gases and the like. Such conduits include an inner lining for coming into direct contact with the high temperature medium which is surrounded by an outer pipe. A space defined between the inner lining and the outer pipe is filled with castable insulating and refractory material. A basic defect in these prior art conduits are that, due to the large difference in the coefficient of expansion between the lining and the castable material, the lining expands and often collapses and becomes distorted due to its contact with the castable material which is a hard brick-like substance.

SUMMARY OF THE INVENTION

The present invention is drawn to the construction and method for fabricating high temperature lined conduits, elbows and tees which permit thermal expansion of the liner while still utilizing castable refractory materials for insulating the conduits, elbows and tees.

Accordingly, an object of the present invention is to provide a high temperature lined conduit comprising, a liner, a flexible insulating refractory blanket around and in contact with the liner, a pipe member around the blanket and spaced therefrom, and castable rigid refractory material between the pipe member and the blanket whereby the liner, when exposed to a high temperature medium, may expand freely. The liner includes male and female slip joint ends for permitting thermal expansion when lengths of the conduit are connected to each other.

Another object of the present invention is to provide high temperature lined elbows comprising, an elbow liner, a flexible insulating refractory blanket around and in contact with the elbow liner, an elbow pipe member around and spaced from the blanket, and castable rigid refractory material between the elbow pipe member and the blanket. Anchoring means are connected to the elbow liner at an intermediate portion thereof having anchor members extending into the refractory material for permitting thermal expansion of the elbow liner on either side of the anchoring means.

A still further object of the present invention is to provide a high temperature lined tee structure comprising, a first liner, a second liner connected and at an angle to said first liner, a flexible insulating refractory blanket around said first and second liners, a first pipe member around said first liner, a second pipe member connected and at an angle to said first pipe member and disposed around said second liner, castable refractory material between said first and second pipe members and said blanket, and anchoring means connected to said first liner in the vicinity of a junction between said first and second liners having at least one anchor member extending into said castable material.

Another object of the present invention is to provide a method of fabricating a high temperature lined conduit comprising, wrapping a liner member with a flexible compressible insulating blanket, compressing the blanket around the liner member, wrapping the compressed blanket with a heat vaporizable layer to maintain the compression of the blanket, positioning the liner member with compressed blanket into a pipe member, positioning a castable refractory material between the compressed blanket and the pipe member, and heating the heat vaporizable layer to vaporize it and permit the blanket to come into close contact with the castable material. The castable material may be positioned by filling the space between the compressed blanket and the pipe member with the castable material after the liner member is in position or by first positioning the castable material in the pipe member with a suitably provided aperture for receiving the liner member with compressed blanket.

A still other object of the present invention is to provide a method of fabricating a high temperature lined conduit with tee comprising, wrapping and compressing a flexible compressible insulating blanket around a first liner member leaving an area of the first liner member exposed, wrapping the compressed blanket with a heat vaporizable layer to maintain the compression thereof, positioning the first liner member with compressed blanket into a first pipe member having an opening in the vicinity of the liner member exposed area, wrapping and compressing a flexible compressible insulating blanket around a second liner member leaving an exposed end portion, wrapping the compressed blanket of the second liner member with a heat vaporizable layer to maintain the compression thereof, connecting the second liner member at its exposed end portion to the first liner member at its exposed area, wrapping and compressing an additional flexible compressible insulating blanket around the exposed end portion and area of the second and first liner members respectively, wrapping the additional blanket with a heat vaporizable layer to maintain the compression thereof, positioning a second pipe member around the second liner member with compressed blanket and connecting the second pipe member to the first pipe member at the opening of the first pipe member, positioning a castable refractory material between the first and second pipe members and the compressed blanket, and heating all of the heat vaporizable layers to vaporize them and permit all of the blankets to come into close contact with the castable material.

A further object of the present invention is to provide a conduit, elbow and tee construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1A is a front elevation of a detail in FIG. 1;

FIG. 3 is a sectional view taken along the lines 3—3 of FIG. 2;

FIG. 4 is a sectional view taken along the lines 4—4 of FIG. 2;

FIG. 5 is a plan view with portions removed for clarity taken along the lines 5—5 of FIG. 2;

FIG. 6 is an enlarged sectional detail partial view of an anchoring post or pin, several of which are shown in FIG. 4;

FIG. 7 is a sectional view of a conduit tee portion and connected elbow portions in accordance with the invention;

FIG. 8 is a partial sectional view taken along line 8—8 of FIG. 7;

DESCRIPTION OF THE PREFERRED EMBODIMENTS

Figure 1:
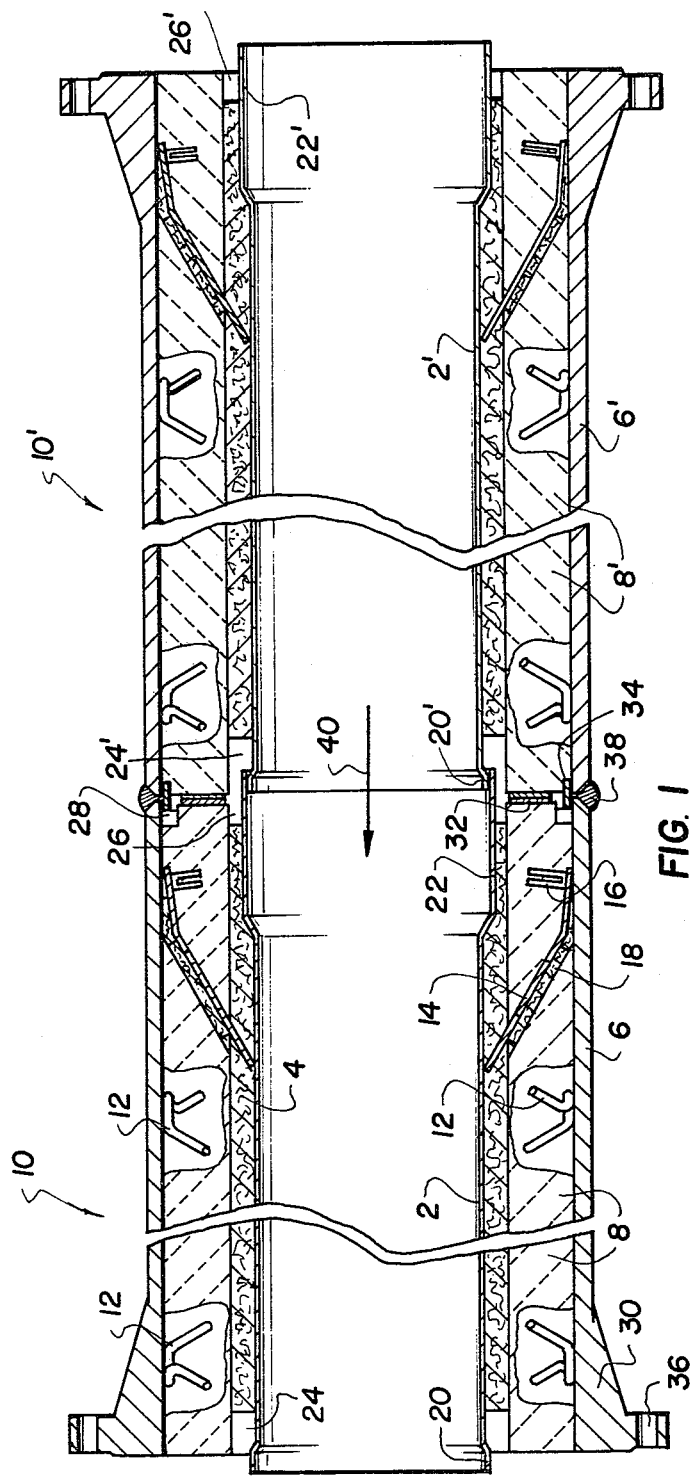
FIG. 1 is a sectional view of a high temperature lined conduit in accordance with the invention.

Referring to the drawings in particular, the invention embodied therein, in FIG. 1, comprises, a high temperature lined conduit generally designated 10 having a liner member or tube 2 wrapped with a flexible insulating and refractory blanket 4 which has been compressed to a fraction, preferably one half of its original thickness. A pipe member 6 is disposed around the compressed blanket 4 and spaced therefrom. Castable refractory material 8 is provided in the space between pipe member 6 and compressed blanket 4.

In a preferred embodiment of the invention, the liner member or tube 2 is made of temperature resistant stainless steel and pipe member 6 is made of carbon steel. Blanket 4 is made of woven or non-woven ceramic fiber, for example, aluminum oxide or silicon oxide fibers. A material actually used for this blanket is known by the trade name Insblanket which is distributed by the A. P. Green Company of Mexico, Mo.

A plurality of wire anchors 12 are welded to the inside diameter of pipe member 6 adjacent its ends. At one end of pipe member 6 is a pipe flange end portion 30 which carries a flange having a plurality of flange holes 36 therethrough for connecting the conduit to other structures. Near one end of liner member 2 is welded a slotted or unslotted cone or fixing member 14 which is welded at its inside diameter end to the outside diameter of liner member 2 and, at its outside diameter end to the inside diameter of pipe member 6. Fixing member 14 includes inwardly extending anchor members 16 which are embedded in the castable material 8. One face of the fixing member 14 facing the major portion of the castable material 8 is covered with an insulating compressible material 18. This material may, for example, be of a similar or slightly denser substance as that making up the blanket 4 and cemented to the face of fixing member 14.

As best shown in FIG. 1A, fixing member 14 may be provided with two sets of circumferentially spaced slots 15 in the opposite end portions of the fixing member. Each of the slots of one set extends inwardly from the inner edge of the fixing member adjacent liner 2 (see FIG. 1) to a point short of the opposite end portion, while each slot 15 of the other set extends inwardly from the outer edge of the fixing member adjacent pipe member 5 (see FIG. 1) to a point short of the opposite end portion. These sets of slots 15 providing the fixing member with the requisite flexibility to compensate for the high thermal gradient, as for example, 1400° F., extending from one end portion of the fixing member to the other end portion and thereby reduce the thermal stress thereon and increase the fatigue life of the fixing member. In some applications where the thermal gradient across fixing member 14 is of a lesser value, the number of slots 15 in the fixing member 14 may be reduced or the slots may be omitted from the outer edge-end portion of the fixing member or from both end portions depending upon the thermal gradient sought to be achieved across the fixing member.

By connecting the inner liner member to the outer pipe member in this fashion, liner member 2 is permitted to expand from this anchoring point without becoming misaligned with the pipe member 6.

A female slip joint end 22 is provided at one end of liner member 2 and a male slip joint end 20 is provided at an opposite end thereof. A female slip joint end 22 of one liner member 2 can thereby receive the male end 20' of a connected liner member 2' of an adjacent conduit length 10'. Spaces 24 and 26 are left without blanket material 4 to permit free expansion of the male and female ends of each liner member. Conduit 10' is similarly provided with spaces 24' and 26' at its male and female liner member ends 20' and 22', respectively.

To connect pipe member 6 of conduit 10 to pipe member 6' of conduit 10', a backing strip or ring 34 is first welded to the inside diameter of one end of pipe member 6'. The exposed face of castable material 8 facing conduit 10' is then covered by a double layer of refractory paper 32 which is of the same chemical composition as the refractory paper 18 and the blanket 4. A suitable material is known by the trade name Inspaper distributed by the A. P. Green Company, identified above.

After securing the refractory material 32 to the castable material 8, conduit 10' is brought into engagement with conduit 10 with portions of the backing ring 34 extending beyond the pipe member 6' moving into a suitably provided space 28 left in the castable material 8. The joint between pipe members 6 and 6' is then completed by a welded seam 38. In this fashion, conduit lengths 10 or 10' of, for example, over ten feet can be connected together to produce a conduit of any desired length.

Conduits, such as the one described above, have already been successfully tested for periods in excess of 2800 hours at internal temperature of 1650° F. and providing external temperature at 250° F. The conduits are used for conveying any high temperature medium such as high temperature combustion gases, steam or air.

Each conduit 10 or 10' is manufactured by first wrapping and compressing the refractory blanket 4 around the liner member 2. The blanket material is preferably compressed to approximately one-half its original width and maintained in its compressed position by a layer of heat vaporizable material which is thereafter held by, for example, tape. In practice, a polyethylene sheet is utilized which is held by masking tape. At this point, two alternate procedures can be followed. In a first procedure, the liner 2 with wrapped compressed and secured blanket 4 is positioned within the pipe member 6 and fixing member 14 is welded into position. Stainless steel wire anchors 12 are then welded to the inside diameter of pipe member 6 or already in position before liner member 2 is inserted. After centering liner 2 with blanket 4 within the pipe member 6, the castable material 8, in flowing form, is filled into the space between blanket 4 with vaporizable layer therearound and pipe member 6.

The entire conduit construction, for example the connected conduits 10 and 10', are then assembled and hot gases are supplied through the interior of the liner members. The vaporizable layer being exposed to this heat is transformed into a gas and escapes from between the blanket 4 and the castable material 8. The heat also sets the castable material 8 if it has not already been set. With the removal of the vaporizable layer, and due to the compressed state of blanket 4, blanket 4 is then brought into close association with the castable material 8 and the completed conduit assembly is ready for use. In practice, the tape holding the polyethylene layer has been found to deteriorate and not to adversely effect the use of the conduit assembly.

In a second possible manufacturing procedure, all of the steps of the first procedure above are repeated except that the pipe member 6 is initially provided with the castable material 8 having a bore defined therethrough for receiving the liner member 2 with wrapped compressed blanket 4.

It has been found that by rigidly anchoring the liner 2 to the pipe member 6 at only one location, that is through fixing member 14, the liner member 2 can expand and contract freely as required. This freedom is permitted through the resiliency of insulating refractory blanket 4 as well as the flexible refractory material 18 on one face of the fixing member 14 and the refractory paper 32 between castable material 8 of conduit 10 and castable material 8' of conduit 10'.

It is also advantageous to position the female and male slip joint ends in a particular fashion depending on the orientation of the conduits 10 and 10' and on the flow of hot medium through the interior of the conduits. With a horizontal run as shown in FIG. 1 and with a medium flow in a direction of arrow 40, the upstream liner member 2' should have a male end 20' and a downstream liner member 2 should have a female end 22. For vertical runs, these slip joints are oriented so that, in a flow direction, the upstream liner member has a female end and the connected downstream liner has a male end. This arrangement for vertical and horizontal runs minimizes contamination of the gas flow within the conduits by materials released from the high temperature refractory blanket wrapping on the outer diameter of the liner members. This relationship is also preferred for elbow and tee members constructed in accordance with the invention to be described in detail hereinafter.

Figure 2:
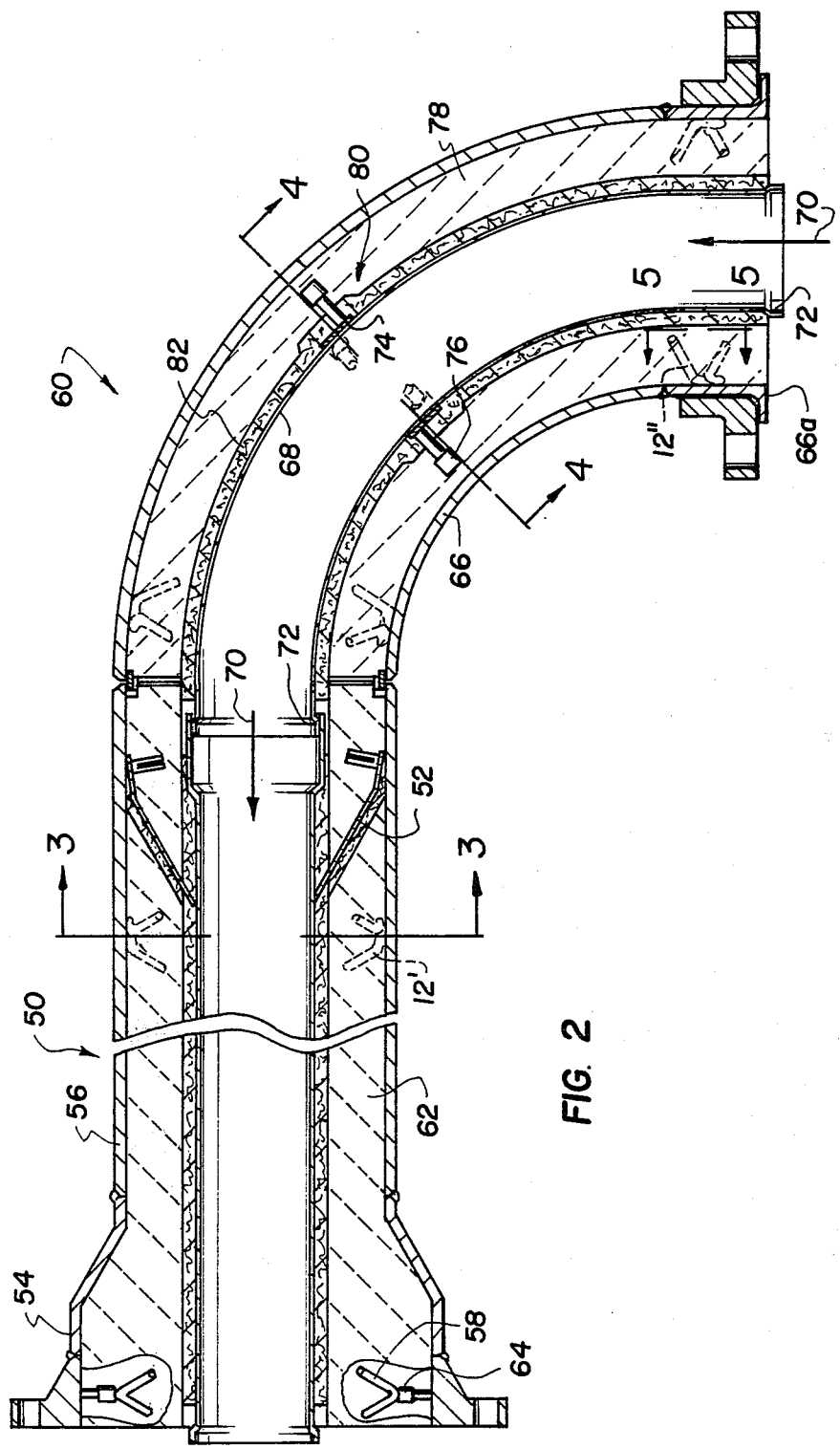
FIG. 2 is a sectional view of a lined conduit with elbow portion in accordance with the invention.

Turning to FIG. 2, a conduit system is shown having a conduit generally designated 50 connected to a 90° elbow generally designated 60.

Conduit 50 is constructed in a similar fashion to conduits 10 and 10' of FIG. 1 and include adjacent one end thereof, a preferably 30° fixing member 52 physically interconnecting the liner member with the outer pipe member. In the embodiment shown in FIG. 2, the simple pipe flange portion 30 is replaced by a two-stage flange 54 which is welded to the pipe member 56. Such a flange permits the connection of conduit 50 to any desired structure or system which requires a larger flange connection. Wire anchors 12, of FIG. 1, are replaced, in two-stage flange 54 by wire anchors 58, shown through portions of the castable material 62 which have been cut away for clarity. Wire anchors 58 are made of stainless steel as were wire anchors 12 and are here supported on posts 64 which are welded at one end to the inside diameter of two-stage flange 54 and, at the other end to the apex of wire anchors 58. Wire anchors 12' similar to those used in FIG. 1 are also utilized adjacent on opposite end of conduit 50 near the fixing member 52. While an elbow type member 66 is connected to pipe member 56 in a similar fashion as the connection between pipe members 6 and 6' of FIG. 1, the elbow liner member 68 of elbow 60 is positioned within pipe elbow member 66 in a different way.

Elbow liner member 68 has two male ends 72 since, with a medium flow in the direction of arrows 70, the above-identified preferred arrangement dictates the use of two male slip joints.

For properly positioning and holding the liner member 68 for expansion within pipe member 66, anchoring means or a centering system generally designated 80 is provided at an intermediate location between ends 72, 72 or at the bisect of the angle of the elbow. This positioning is preferred whether the elbow is a 90° elbow as shown or any other elbow whether larger or smaller in angle.

Anchoring means 80 comprises a reinforcing band 74 which is welded to the outer diameter of elbow liner member 68. Extending radially outwardly from reinforcement band or ring 74 are a plurality of hollow tubes or pins 76. These tubes are preferably disposed in two rows which are spaced from each other in the axial direction of liner member 68 as shown in FIG. 2. As shown in FIG. 4, with portions of the castable material 78 removed for clarity, each row of tubes or pins 74 includes 3 tubes or pins which are offset from the tubes or pins of the other row by 60°.

In completing the elbow structure, elbow liner member 68 is surrounded with compressed flexible refractory blanket 82 which in turn is surrounded by castable material 78. This structure can be manufactured with the method utilized to manufacture the straight conduit sections with the castable material 78 being held by wire anchors 12" adjacent the ends of the elbow 60. The shape and mounting of wire anchors 12" are best shown in FIGS. 3 and 5. In FIG. 5, the wire anchor 12" is shown welded at its semicircular base 12a with its arms 12b at an angle to a forward edge 66a of elbow pipe member 66. This mounting and positioning of anchors 12" are similar to the mounting and positioning of other anchors 12' and 12 utilized in conduits 50 and 10 respectively. As with FIG. 4, FIG. 3 shows portions of the castable material 78 cut away for clarity to reveal the anchors 12".

FIG. 6 shows a single pin or tube 76 shown in greater detail. Hollow tubes 76 are filled with flexible compressable insulating and refractory material 90 which is similar in composition to the blanket material 82 but preferably of a non-woven material such as for example, the material known under the trade name of Inswool distributed by the A.P. Green Company identified above. As shown in FIG. 6, the amount of refractory flexible material 90 overflows the cavity formed by hollow tube 76 and extends into portions of the castable material 78. This permits the thermal expansion of anchoring member or tube 76 while, at the same time, maintaining and centering the position of the elbow liner member 68 with respect to the castable material 78 and the pipe member 66.

In manufacturing the elbow assembly, each anchoring member or tube 76 with overflowing flexible refractory material 90 is covered with a heat vaporizable layer or cap 88, preferably made of polyethylene in accordance with a preferred embodiment of the invention. The cap 88 is secured temporarily by electrical tape 92 or the like and, in a similar fashion to the layer 84 maintaining and compressing the blanket 82, is evaporated by hot gases or medium supplied through the interior of the liner member 68. The tape 92 has been found to deteriorate and not affect the operation of the conduits as with the tape holding the layer 84 around the compressible blanket 82.

Turning to FIG. 7, a 45° tee structure is shown which is formed by the intersection of two straight conduit portions.

45° angle tee can be replaced by a tee of any angle smaller or larger than 45° without departing from the principles of the invention.

Elbows 110 and 120 are constructed in a similar fashion to elbow 60 shown in FIG. 2 and connected to the ends of tee 100 in a similar fashion to the connection between conduit 50 and elbow 60 of FIG. 2 and between conduits 10 and 10' of FIG. 1.

Tee 100 comprises a first liner member 102 which is connected to an intersecting second liner member 104. A suitably provided oval aperture 126 is provided in first liner member 102 to establish communication between liner members 104 and 102. Welded or otherwise connected to a portion of the outer diameter of first liner member 102 is a reinforcing band 118 having a plurality of anchoring members or tubes 122 extending therefrom and into a castable material 124 positioned between the first and second liner members 102 and 104 and first and second pipe members 106 and 108.

As shown in FIG. 8, the reinforcement band 118 extends around approximately one half the outer diameter of first liner member 102 and has a plurality of pins or tubes 122 distributed along the band 118. As shown in FIG. 7, the tubes 122 are preferably positioned in two rows which are offset with respect to each other in the axial direction of first liner member 102 and, as shown in FIG. 8 the pins or tubes 122 of one row are offset with respect to those of the other row.

Also as shown in FIG. 7, the overall centering or anchoring means 128 comprising the band 118 and members 122, is positioned approximately at the intersection between the axes of the first and second liner members 102 and 104. Both the first and second liner members, as with the other embodiments of the invention are wrapped with compressed flexible refractory and insulating material or blankets 112 and 114 with an additional compressed blanket covering 116 covering the junction between first and second liner members 102 and 104. The requirement for this separate additional blanket will be treated in greater detail hereinafter.

By positioning the anchoring or centering means 128 near the junction between the first and second liner members, the liner member assembly 102, 104 is mobilized at this point and permitted to expand freely in all directions away from this point through the cushioning action of the blankets 112, 114, and 116. Suitably provided male and female slip joints are connected to the ends of first liner member 102 and the one free end of second liner member 104.

While the reinforcement band 118 is shown as semicircular, the band can be larger or smaller as required.

Anchors are also utilized and connected to the inner diameter of the first and second pipe members 106 and 108 for maintaining the position of castable 124 as with the other embodiments of the invention. Pins or tubes 122 are mounted and fabricated to the rest of the structure in the same way as pins 76 of the embodiment shown in FIGS. 2-6.

In the fabrication of the 45° tee structure shown in FIG. 7, liner member 104 is welded to liner member 102 prior to the welding of first and second pipe members 106 and 108 together. The application of the additional compressed blanket covering 116 at and adjacent the weld joint is then accomplished prior to the welding of first and second pipe members 106 and 108 together. Similarly, the double tee shown in FIG. 9 is fabricated by welding tee liners 142 and 143 to liner 140 prior to welding pipe members 154 and 156 to pipe member 152 so that compressed flexible refractory and insulating material can be applied to cover the weld joint areas between liner members 140, 142 and 143.

Figure 9:
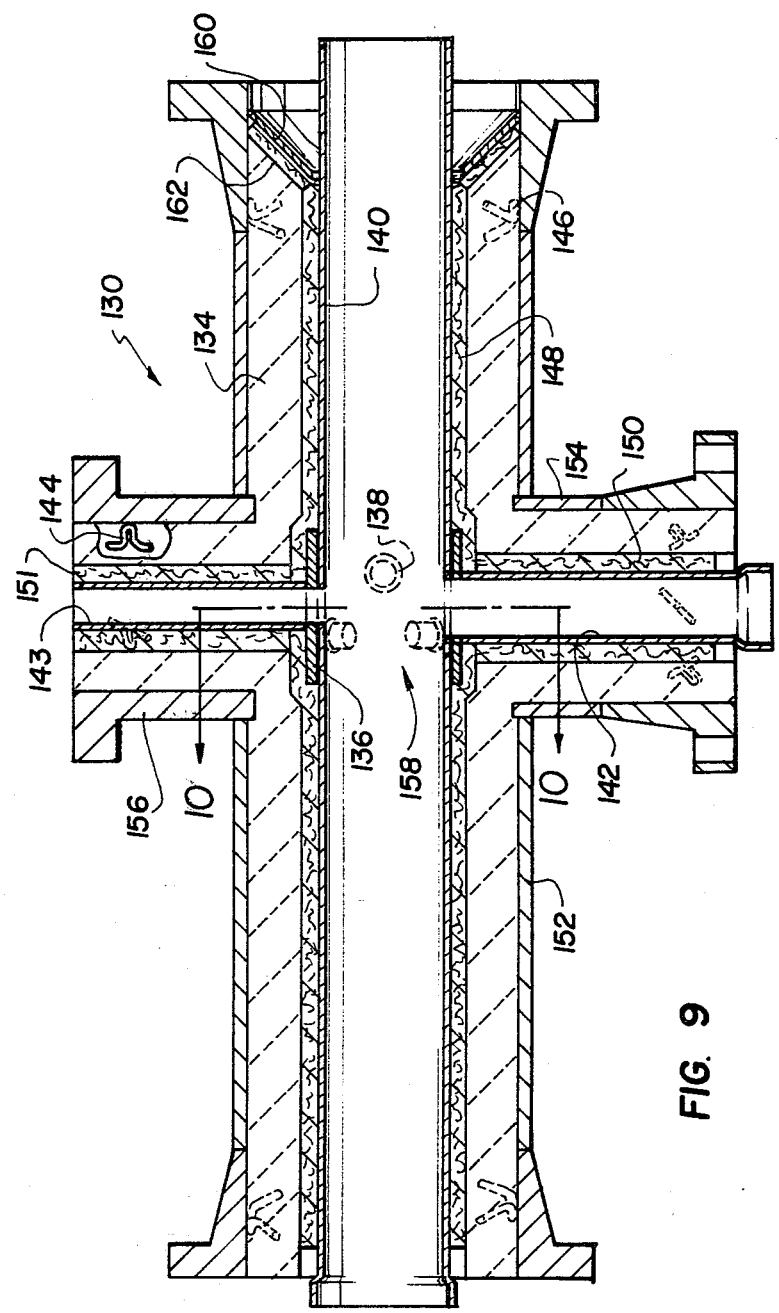
FIG. 9 is a sectional view of a double tee or cross conduit structure in accordance with the invention.
Figure 10:
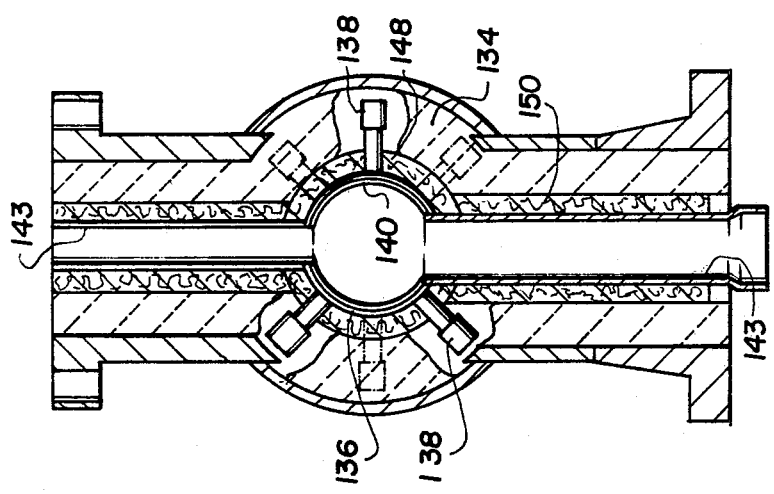
FIG. 10 is a sectional view taken along lines 10—10 of FIG. 9.

Turning to FIGS. 9 and 10, a double tee or cross structure 130 is shown.

Cross or double tee 130 comprises a liner member 140 wrapped with compressible flexible refractory and insulating blanket 148 which is surrounded by castable material 134 and pipe member 152 in a fashion similar to the construction of the other embodiments of the invention. Castable material 154 extends into the double tee arms formed by tee pipe members 154 and 156 with tee liners 142 and 143 which themselves are wrapped with blanket portions 150 and 151.

As with the other embodiments of the invention, the castable material 134 is maintained in the position by a plurality of wire anchors 144 and 146 welded to the inner diameters of the respective pipe members and near the ends of the pipe members.

The double tee or cross structure includes anchoring or centering means 158 which, as with the embodiments shown in FIG. 7 for the 45° elbow, is positioned at the junction between the main conduit section and the tee sections or arms. Centering means 158 comprises a reinforcing band 136 which is welded to the outside diameter of liner 140 and provided with the necessary holes to permit communication between the tee lines 142 and 143 of the mean liner 140. Extending from band 136 are a plurality of pins or hollow tubes 138 which are positioned in two offset rows and staggers as shown in FIGS. 9 and 10. Expansion is thus permitted from centering means 148 while the respective positions of the liners and the pipes are maintained.

If the end of the double tee 130 is to expand into a chamber, that end of the refractory 134 is protected by a cone member 160 which is covered by flexible refractory material 162 such as Inspaper, heretofore identified. The conical member 160 is to be welded at its outside diameter to the inside diameter of pipe member 152. The inside diameter of cone member 160 has clearance with the outside diameter liner member 140 to allow liner member 140 to expand radially without contacting the inside diameter of cone member 160. If one end of double tee 130 is to be fitted into the end of a standard pipe, this end of the double tee would then be constructed with a female slip joint welded to liner member 140 and no cone member 160 would be used.

The refractory in this application would be flush with the flange face similar to the male end.

An example of a suitable castable usable in all embodiments of the invention is known by the trade name VSL-50 supplied by the A.P. Green Company identified above.

While specific embodiments of the invention have been shown and described in detail to illustrate the application of the principles of the invention, it will be understood that the invention may be embodied otherwise without departing from such principles.

What is claimed is:

1. A high temperature lined elbow comprising, an elbow liner member, a flexible insulating blanket around and in contact with said elbow liner member, an elbow pipe member around said blanket and spaced therefrom, castable rigid refractory material between said blanket and said elbow pipe member, and centering means connected to said elbow liner member and extending toward said elbow pipe member and into said castable material whereby said elbow liner member can expand from said centering means with respect to said elbow pipe member.

2. An elbow according to claim 1, wherein said centering means includes a plurality of pin members connected to and extending radially outwardly of said elbow liner member having flexible insulating material adjacent ends of said pin members to permit thermal expansion of said pin members in said castable material.

3. An elbow according to claim 1, wherein said flexible insulating material is compressed to a fraction of its original width and in close contact with said castable material.

4. An elbow according to claim 1, wherein said flexible insulating blanket is compressed to a fraction of its original width and held in a compressed state by a layer of heat vaporizable material adapted to be heated and vaporized to permit close contact between said blanket and said castable material.

5. An elbow according to claim 1, including at least one anchor connected to an inside diameter of said elbow pipe member adjacent an end thereof extending into said castable material.

6. An elbow according to claim 1, wherein said centering means comprises a plurality of hollow tubes connected to and extending from an intermediate portion of said elbow liner member having flexible insulating material therein and therebeyond into said castable material, whereby said tube members can expand into said castable material.

7. An elbow according to claim 6, further including a cap of heat vaporizable material overlaying said flexible insulating material extending from said tube member into said castable material adapted to be heated and vaporized to permit close contact between said flexible insulating material extending from said tube member and said castable material.

8. An elbow according to claim 6, wherein said centering means further includes a reinforcing band connected to an outer diameter of said elbow liner member to which said tube members are connected.

9. An elbow according to claim 8, wherein said reinforcing band is at a bisect of an angle of said elbow.

10. An elbow according to claim 8, wherein said plurality of tubes are disposed in two rows offset with respect to an axis of the elbow member.

11. An elbow according to claim 10, wherein tube members in each of said rows are offset with respect to each other.

12. A centering anchor for a conduit having an inner liner member, a pipe member around and spaced outwardly of the liner member and a castable rigid material between the liner member and the pipe member and in contact with the pipe member, comprising:
    at least one tube defining a hollow space connected to and extending outwardly from the liner member and into the castable material, and
    flexible insulating refractory material filling said hollow space and extending from an end of said tube into the castable material to permit thermal expansion of said tube, whereby the liner member is anchored with respect to the castable material and the pipe member.

13. A centering anchor according to claim 12, further including a flexible insulating blanket compressed and wrapped around the liner member and in close contact with the castable material.

14. A centering anchor according to claim 12, including a plurality of said tube evenly distributed around a circumference of the liner member.

15. A high temperature lined tee comprising, a first liner member, a second liner member connected to said first liner member and extending at an angle therefrom, a flexible insulating blanket around and in contact with said first and second liner members, a first pipe member around and spaced from the blanket covering said first liner member, a second pipe member connected and extending at an angle to said first pipe member disposed around and spaced from the blanket covering said second liner member, castable rigid refractory material between said pipe members and said flexible insulating blanket, and centering means connected to said first liner member adjacent the junction between said first and second liner members extending into said castable material.

16. A tee according to claim 15, wherein said flexible insulating blanket is compressed to a fraction of its original width.

17. A tee according to claim 16, further including a layer of heat vaporizable material over said compressed blanket for maintaining the compression of said blanket and adapted to be heated and vaporized to permit close contact between said blanket and said castable material.

18. A tee according to claim 15, wherein said centering means comprises a reinforcing band connected around at least a portion of said first liner member and a plurality of pin members extending radially outwardly from said reinforcing band.

19. A tee according to claim 18, wherein said pins are disposed in two rows offset with respect to a major axis of said first liner member, the pin members of one row being offset with respect to the pin members of the other row.

20. A tee according to claim 18, wherein said pin members comprise tube members each filled with flexible insulating material which extends out from the end of said tube members and into said castable material.

21. A tee according to claim 20, including a cap of heat vaporizable material over said flexible material extending from the end of each of said tube members adapted to be heated and vaporizable to permit close contact between said flexible material extending from the end of said tube members and said castable material.

22. A high temperature lined conduit comprising a liner member, a flexible insulating blanket around and in contact with said liner member, a pipe member around said blanket and spaced therefrom, and castable rigid refractory material between said pipe member and said blanket, said insulating blanket being compressed to a fraction of its original thickness and wrapped with a layer of vaporizable material which is adapted to be heated and vaporized to permit close contact between said insulating blanket and said castable rigid refractory material.

23. A conduit according to claim 22, wherein said heat vaporizable material comprises polyethylene.

24. A high temperature lined conduit comprising, a liner member, a flexible insulating blanket around and in contact with said liner member, a pipe member around said blanket and spaced therefrom, a castable rigid refractory material between said pipe member and said blanket, a fixing member connected between said liner member and said pipe member adjacent one end thereof for substantially holding said liner member with respect to said pipe member in the vicinity of said fixing member and permitting the thermal expansion of said liner member with respect to said pipe member, said fixing member comprising a truncated cone having an inner diameter end connected to said liner member and an outer diameter end connected to said pipe member, and at least one anchor extending from said cone and into said castable material.

25. A high temperature lined conduit comprising, a liner member, a flexible insulating blanket around and in contact with said liner member, a pipe member around said blanket and spaced therefrom, castable rigid refractory material between said pipe member and said blanket, at least one additional conduit having one additional liner member, an additional flexible insulating blanket, an additional pipe member and additional castable material, said additional conduit connected to said first-mentioned conduit, said first-mentioned pipe member and said additional pipe member being connected at respective ends thereof by a backing strip connected to the inside diameter of said respective ends, and flexible insulating refractory material connected between facing ends of said first-mentioned castable material and said additional castable material.

26. A high temperature lined conduit comprising, a liner member, a flexible insulating blanket around and in contact with said liner member, a pipe member around said blanket and spaced therefrom, castable rigid refractory material between said pipe member and said blanket, and a fixing member connected between said inner liner member and said pipe member adjacent one end thereof for substantially holding said liner member with respect to said pipe member in the vicinity of said fixing member and permitting the thermal expansion of said liner member with respect to said pipe member, said fixing member comprising a truncated cone having an inner diameter end connected to said liner member and an outer diameter end connected to said pipe member, said truncated cone including a plurality of slots adjacent at least one of said inner diameter end and said outer diameter end of said truncated cone, said slots extending from said at least one of said inner diameter end and said outer diameter end and into said truncated cone.

27. A high temperature lined conduit comprising, a liner member, a flexible insulating blanket around and in contact with said liner member, a pipe member around said blanket and spaced therefrom, a castable rigid refractory material between said pipe member and said blanket, and at least one additional conduit having one additional liner member, flexible insulating blanket, pipe member and castable material connected to said first mentioned conduit, said first mentioned pipe member and said additional pipe member being connected at respective ends thereof by a backing strip connected to the inside diameter of said respective ends, said backing strip comprising a ring connected to the inside diameter of one of said first mentioned and additional pipe members and slidably receiving the inside diameter of the other of said first mentioned and additional pipe members, and means connecting said first mentioned and additional pipe members together.

28. A conduit according to claim 27, wherein said first mentioned liner member includes one of a male and female end and said additional liner member includes one of a female and male end respectively, said male end slip fit into said female end to permit thermal growth of said former mentioned and additional liner members.

29. A conduit according to claim 28, wherein, for horizontal runs of said former mentioned and additional conduit, in a flow direction, said male end is incuded on an upstream one of said liner members and for vertical runs, said female end is included on an upstream one of said liner members.

* * * * *